United States Patent [19]
Sasaki

[11] Patent Number: 6,047,914
[45] Date of Patent: Apr. 11, 2000

[54] DEVICE FOR RESTRICTION AN AMOUNT OF ROTATION AND WEBBING RETRACTOR

[75] Inventor: Sumikazu Sasaki, Aichi-ken, Japan

[73] Assignee: Kabushiki Kaisha Tokai-Rika-Denki-Seisakusho, Aichi-ken, Japan

[21] Appl. No.: 09/197,537

[22] Filed: Nov. 23, 1998

[30] Foreign Application Priority Data

Nov. 28, 1997 [JP] Japan .................................. 9-328611

[51] Int. Cl.$^7$ .................................................. B65H 75/48
[52] U.S. Cl. ..................... 242/379.1; 280/805; 297/470
[58] Field of Search ........................ 242/379.1; 297/470, 297/471, 472; 411/216, 217, 221, 204; 280/805, 806

[56] References Cited

U.S. PATENT DOCUMENTS

| | | | |
|---|---|---|---|
| 3,237,665 | 3/1966 | Bass ..................................... | 411/204 X |
| 3,715,144 | 2/1973 | Minolla ................................ | 297/470 X |
| 3,790,099 | 2/1974 | Beller .................................... | 242/379.1 |
| 4,322,046 | 3/1982 | Tanaka et al. ........................ | 242/379.1 |
| 4,686,284 | 8/1987 | Bradley, Jr. .......................... | 411/221 X |
| 5,626,306 | 5/1997 | Miller, III et al. ................... | 242/379.1 |
| 5,785,269 | 7/1998 | Miller, III et al. ................... | 242/379.1 |
| 5,836,534 | 11/1998 | Bohmler ............................... | 242/379.1 |

*Primary Examiner*—Donald P. Walsh
*Assistant Examiner*—Emmanuel M. Marcelo
*Attorney, Agent, or Firm*—Sixbey Friedman Leedom & Ferguson; Thomas W. Cole

[57] ABSTRACT

A notched ring rotates together with a spool and opposes a disk of a locking shaft portion. A substantially semicircular engaging projection is formed on an opposing surface of the notched ring in the peripheral direction thereof. An engaging concave portion is formed at the disk so as to correspond to the engaging projection. When the spool is rotated in the withdrawing direction of a webbing and the opposing surface of the notched ring abuts the disk, the engaging projection enters and engages the engaging concave portion without clearance therebetween. Accordingly, even if rotating force is further applied to the spool in the withdrawing direction of the webbing, movement of the notched ring in the outer peripheral direction is prevented, and a state in which the rotation of the spool is restricted is maintained.

11 Claims, 7 Drawing Sheets

DEVICE FOR RESTRICTION AN AMOUNT OF ROTATION AND WEBBING RETRACTOR

BACKGROUND OF THE INVENTION

1. Field of the Invention

The present invention relates to a device for restricting an amount of rotation and a webbing retractor, and in particular, to a webbing retractor in which the amount of taking-up of a webbing can be made constant by restricting the amount of rotation of a spool which takes up the webbing and a device for restricting an amount of rotation used in this webbing retractor.

2. Description of the Related Art

Figure 7:
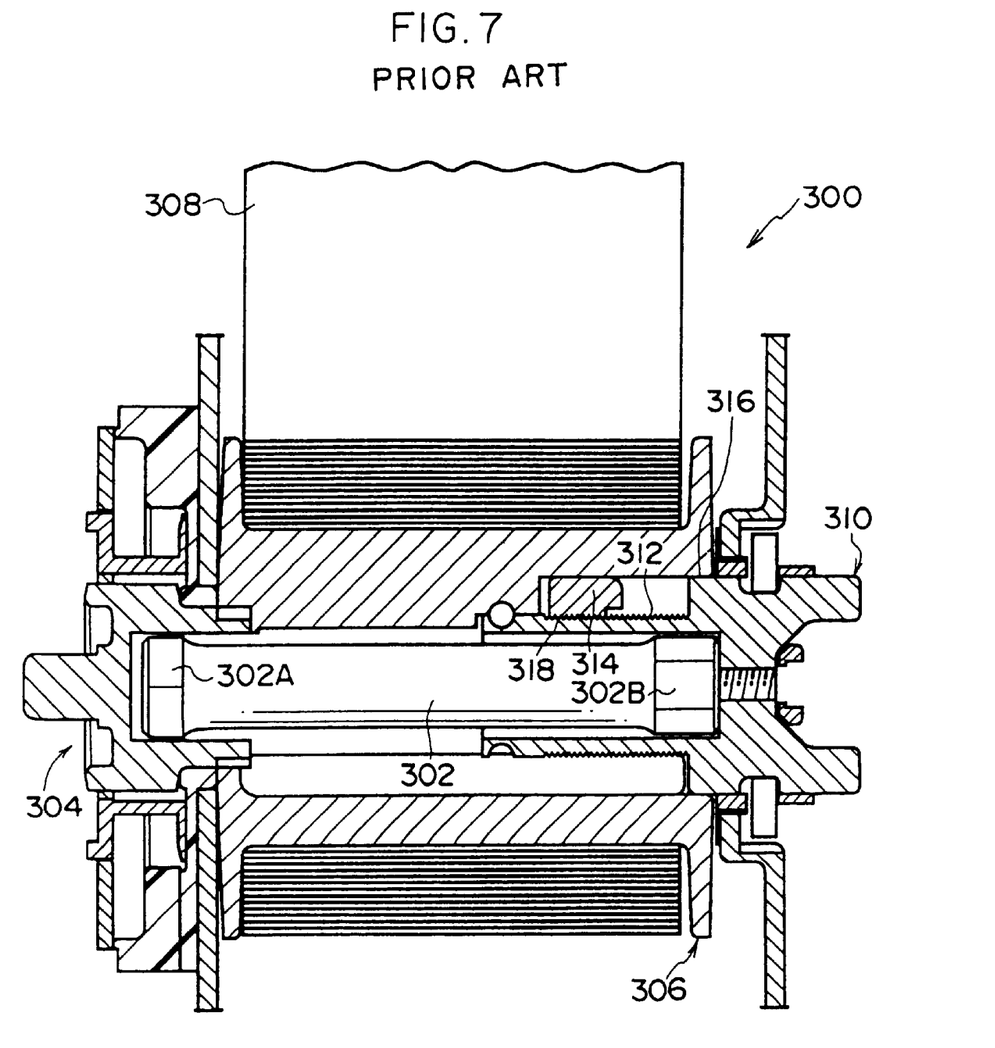
FIG. 7 is a cross-sectional view of a conventional webbing retractor.

In a conventional webbing retractor 300 shown in FIG. 7, when an acceleration sensor or the like detects that deceleration of a predetermined value or more has occurred in a vehicle, a pretension portion 304 provided at one end 302A of a torsion bar 302 rotates the one end 302A of the torsion bar 302 in the taking-up direction of the webbing. A spool 306 also rotates integrally with the torsion bar 302 in the taking-up direction of the webbing, and the webbing 308 is taken up onto the spool 306. At this time, rotation of a locking shaft portion 310, which is provided at the inner side of the spool 306, in the withdrawing direction of the webbing is prevented by an unillustrated lock portion.

Thereafter, when a withdrawing force is applied to the webbing 308, the spool 306 rotates in the withdrawing direction of the webbing. Because rotation of the torsion bar 302 is prevented by the locking shaft portion 310 at the other end 302B, the torsion bar 302 is twisted by rotating force applied to the one end 302A and acts as a so-called force limiter.

In this way, a relative difference in rotation is generated between the fixed locking shaft portion 310 and the rotating spool 306. Due to this difference in rotation, a ring 314, which is screwed to a male screw 312 of the locking shaft portion 310, rotates integrally with the spool 306 and moves toward a disk 316 of the locking shaft portion 310. When the ring 314 abuts the disk 316, the movement and rotation of the ring 314 is prevented. Accordingly, the rotation of the spool 306 is limited and the amount of withdrawal of the webbing 308 is constant.

Regarding this webbing retractor 300, in a state in which the ring 314 abuts the disk 316, when a large rotating force is further applied to the spool 306 in the direction in which the webbing is withdrawn and the ring 314 moves toward the disk 316, the side flank of a female screw 318, to which pressure is applied, receives outward force in the radial direction along the side flank of the male screw 312, to which pressure is applied. In this way, there is the concern that the ring 314 will be pulled outwardly in the radial direction, that the female screw 318 will be removed from the male screw 312, and that the spool 306 will rotate freely around the locking shaft portion 310. For this reason, it is necessary to increase the strength of the ring 314 by thickening the ring 314, forming the ring 314 from a material having high rigidity, or the like. Accordingly, the ring 314 is heavier and the manufacturing thereof takes much time and labor.

This problem is not only applied to the above-described webbing retractor 300 but is also applied, in general, to a device for restricting an amount of rotation in which a moving body screwed to a shaft body moves rotatingly in the axial direction and the amount of rotation is restricted to a predetermined amount by restricting this axial direction movement.

SUMMARY OF THE INVENTION

With the aforementioned in view, an object of the present invention is to provide a device for restricting an amount of rotation which can restrict the amount of rotation without increasing the weight or without requiring much time and labor for manufacturing and a webbing retractor in which the amount of rotation of a spool is restricted and the amount of withdrawal of a webbing can be made constant.

The invention described in claim 1 is a device for restricting an amount of rotation, comprising: a shaft body which has a male screw on the outer periphery; a moving body which is screwed to the male screw and formed coaxially with the shaft body, the moving body moving along the shaft body in the axial direction due to axial rotation; restricting means which restricts the amount of movement of the moving body to a predetermined range; and preventing means which prevents removal of the moving body from the shaft body in a state in which the movement of the moving body is restricted by the restricting means.

When the moving body which is formed coaxially with the shaft body rotates, the moving body moves in the axial direction of the shaft body.

This movement of the moving body is restricted to a predetermined range by the restricting means. In this state, when the moving body further rotates relatively around the shaft body in this state, outward force in the radial direction is applied to the moving body along the pressure-receiving side flank of the male screw and the moving body is removed from the shaft body.

However, since the outward movement in the radial direction, i.e., the removal of the moving body is prevented by the preventing means, the moving body does not move outwardly in the radial direction. As a result, a state in which the moving body is screwed to the male screw is maintained. Since the moving body does not rotate freely around the shaft body, a state in which the rotation of the moving body is restricted is maintained.

In this way, because the outward movement in the radial direction of the moving body is prevented by the preventing means, there is no need to increase the strength of the moving body by thickening the moving body or by forming the moving body from a hard material. As a result, the device for restricting an amount of rotation is formed and the amount of rotation can be restricted without increasing the weight or without requiring much time and labor for the manufacturing thereof.

The invention described in claim 2 is a device for restricting an amount of rotation according to the invention described in claim 1, wherein the restricting means is a wall body which is formed at the shaft body and which, by abutting the moving body which has moved in the axial direction of the shaft body due to the rotation, restricts the movement thereof, and the preventing means is an engaging portion which is formed at the moving body and which engages with a portion to be engaged formed on the wall body in a state in which the moving body abuts the wall body.

Accordingly, the outward movement in the radial direction of the moving body can be prevented by the simple structure, i.e., the wall body and the portion to be engaged are formed at the restricting means and the engaging portion is formed at the moving body.

The invention described in claim 3 is a webbing retractor, comprising: a shaft which has a male screw on the outer periphery; a spool which is coaxially rotatable with the shaft and which effects one of taking-up and withdrawing of a webbing due to the rotation; a ring which is screwed to the male screw and which integrally rotates with the spool, the ring moving in the axial direction of the shaft due to the rotation; a restricting wall which is formed at the shaft and which, by abutting the ring which has moved in the axial direction of the shaft, restricts the movement thereof; and an engaging portion which is formed at the ring and, in a state in which the ring abuts the restricting wall, engages with a portion to be engaged formed on the restricting wall and prevents outward movement of the ring in the radial direction.

When the spool relatively rotates around the shaft, the ring which has been screwed to the male screw of the shaft rotates integrally with the spool and moves in the axial direction of the shaft.

Because the movement of this ring is restricted to a predetermined range by the restricting wall, the rotation of the spool is also restricted. In this state, the engaging portion formed at the ring engages with the portion to be engaged formed on the restricting wall and the outward movement of the ring in the radial direction is prevented. Consequently, even if outward force in the radial direction is applied to the ring along the pressure-receiving side flank of the male screw so as to further rotate the spool relatively around the shaft, the ring does not move outwardly in the radial direction. As a result, a state in which the ring is screwed to the male screw is maintained. Since the ring does not rotate freely around the shaft, a state in which the rotation of the spool is restricted is maintained.

In this way, because the engaging portion engages with the portion to be engaged and the outward movement in the radial direction of the ring is prevented, there is no need to increase the strength of the ring by thickening the ring, forming the ring from a hard material, or the like. As a result, the amount of rotation of the spool can be restricted without increasing the weight or without requiring much time and labor for the manufacturing of the ring.

DESCRIPTION OF THE PREFERRED EMBODIMENTS

Figure 1:
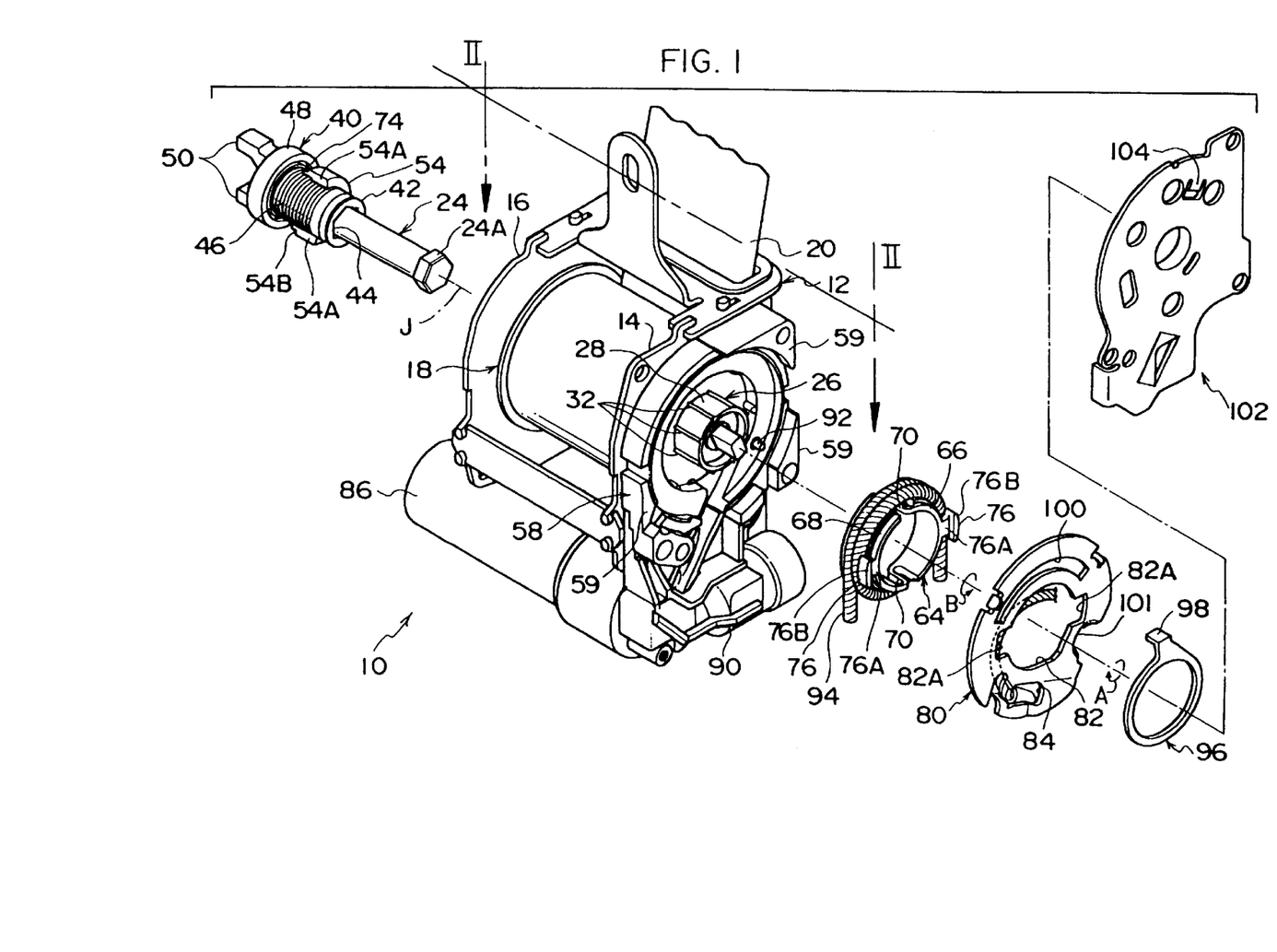
FIG. 1 is an exploded perspective view which shows a webbing retractor relating to a first embodiment of the present invention.
Figure 2A:
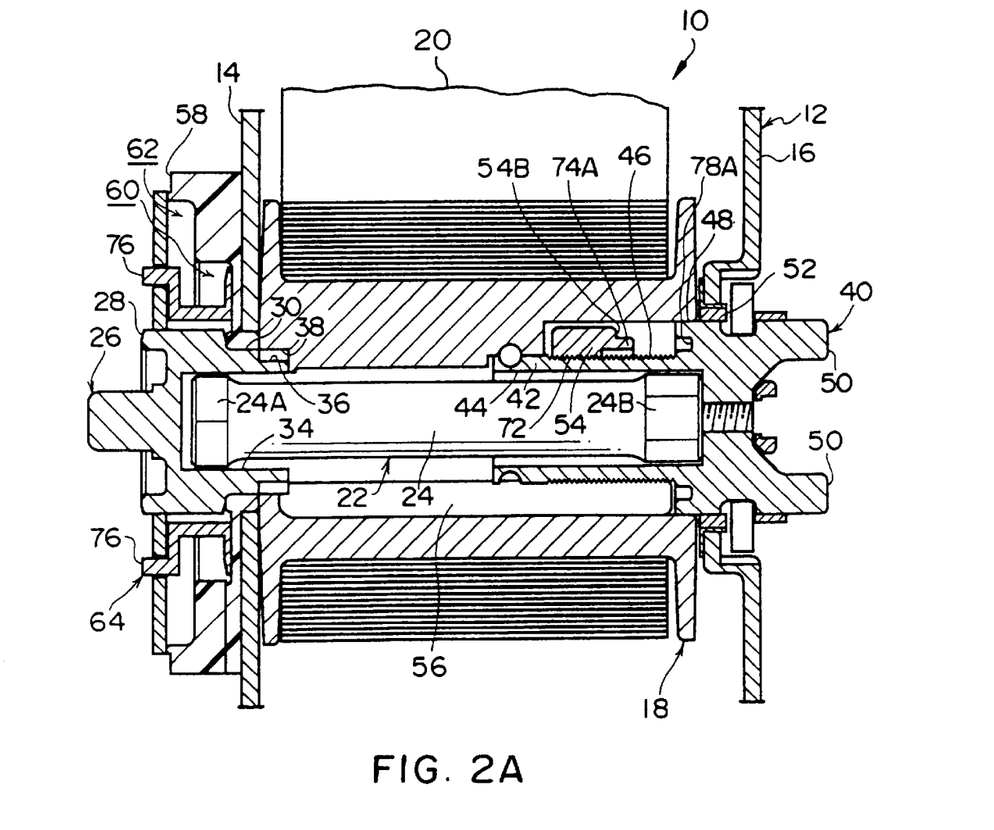
FIG. 2A is a cross-sectional view taken along line II—II in FIG. 1 of the webbing retractor relating to the first embodiment of the present invention.
Figure 3:
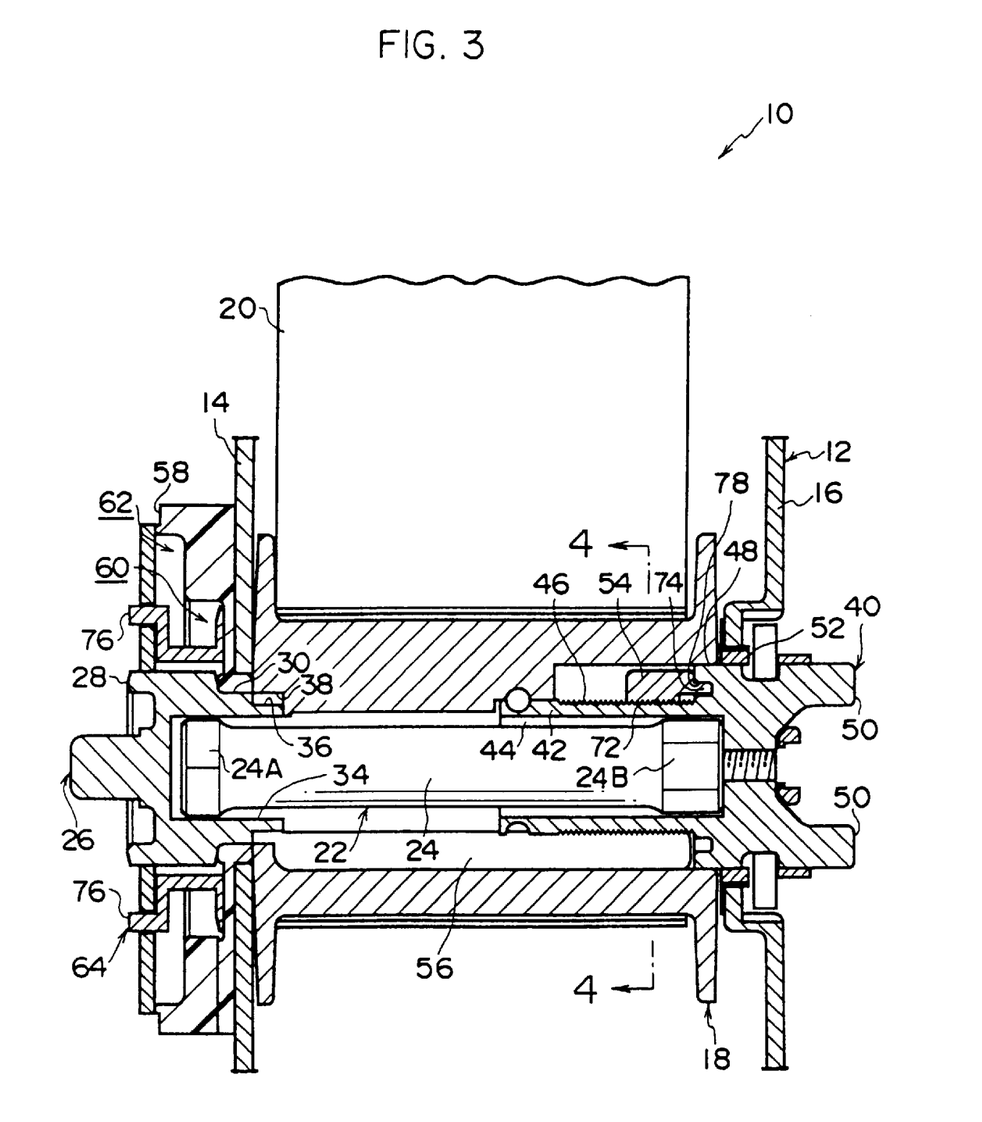
FIG. 3 is a cross-sectional view, which shows a state in which a webbing is withdrawn from the state shown in FIG. 2, of the webbing retractor relating to the first embodiment of the present invention.

FIGS. 1 through 3 show a webbing retractor 10 relating to a first embodiment of the present invention in which a device for restricting an amount of rotation is used.

The webbing retractor 10 has a frame 12 which is attached to a vehicle (unillustrated). At the frame 12, a pair of supporting plates 14 and 16 are disposed in parallel. A spool 18, which is formed in a substantially cylindrical shape and whose flanges protrude in a radial direction from both ends in the axial direction thereof, is provided between the supporting plates 14 and 16. One end of a webbing 20 is secured to this spool 18 and the webbing 20 is taken up onto the spool 18. FIGS. 1 and 2A show a state in which the webbing 20 is taken up onto the spool 18. Further, FIG. 3 shows a state in which the webbing 20 is withdrawn from the spool 18.

A torsion portion 22 is provided inside the spool 18 coaxially with the central axis of the spool 18. The torsion portion 22 has a substantially columnar torsion bar 24 which is slightly longer than the axial direction length of the spool 18. The torsion bar 24 is formed of a plastically deformable material such as a metal. When torsional force of a predetermined value or more is applied to the torsion bar 24 in the peripheral direction thereof, the torsion bar 24 is plastically deformed and twisted.

An inserting portion 24A in the shape of a hexagonal prism is formed at one end of the torsion bar 24. The inserting portion 24A is inserted through a hexagonal insertion hole 34 (see FIGS. 2A and 3) formed at a shaft portion 26 for pretension which forms a part of the torsion portion 22. The torsion bar 24 and the shaft portion 26 for pretension rotate integrally.

This shaft portion 26 for pretension has a portion 28 to be nipped which is formed in a substantially cylindrical shape and a cylindrical gear portion 30 (see FIGS. 2A and 3) which has a diameter smaller than that of the portion 28 to be nipped and which is formed coaxially with the portion 28 to be nipped. At the outer periphery of the portion 28 to be nipped, a plurality of projections 32 (see FIG. 1) whose longitudinal directions coincide with the direction of the central axis of the torsion bar 24 and whose distal ends are pointed acutely are provided at predetermined intervals in the peripheral direction of the portion 28 to be nipped. When nipping portions 66 and 68 of a drum 64, which will be described later, have nipped the portion 28 to be nipped, the projections 32 bite into the inner surface of the drum 64 and slipping of the drum 64 is thereby prevented.

An external tooth gear 36 is formed on the outer periphery of the gear portion 30. This external tooth gear 36 engages with an internal tooth gear 38 formed on the inner periphery of the spool 18 over the entire periphery thereof such that the spool 18 and the shaft portion 26 for pretension rotate integrally. Accordingly, the torsion bar 24 rotates integrally with the spool 18 via the shaft portion 26 for pretension at one end of the torsion bar 24.

A locking shaft portion 40 which forms a part of the torsion portion 22 is provided at the other end of the torsion bar 24 (the upper left-hand side in FIG. 1 and the right-hand side in FIGS. 2A and 3). The locking shaft portion 40 is formed in a substantially cylindrical shape and a hexagonal insertion hole 44 is formed at the locking shaft portion 40 so as to extend from one end of the locking shaft portion 40 in the axial direction thereof. The locking shaft portion 40 comprises a pipe-shaped portion 42, a disk 48, and a piece 50 to be locked. The pipe-shaped portion 42 has a male screw 46 on the outer periphery. The disk 48 is formed at the other end of this pipe-shaped portion 42 so as to close the insertion hole 44 and juts outwards from the pipe-shaped portion 42 in the radial direction. The piece 50 to be locked protrudes from this disk 48 in a bifurcated manner. An inserting portion 24B which is formed in the shape of a hexagonal prism at the other end of the torsion bar 24 is inserted through the insertion hole 44, and the torsion bar 24 and the locking shaft portion 40 rotate integrally. FIG. 1 shows a state in which this inserting portion 24B is inserted through the insertion hole 44.

In a state in which the inserting portion 24B of the torsion bar 24 is inserted through the insertion hole 44 in this way, the spool 18 is disposed between the supporting plates 14 and 16, the external tooth gear 36 of the shaft portion 26 for pretension is engaged with the internal tooth gear 38 of the spool 18 from the supporting plate 14 side, and the torsion bar 24 formed integrally with the locking shaft portion 40 is inserted into the inner side of the spool 18 from the supporting plate 16 side. Thus, as shown in FIGS. 2A and 3, the torsion bar 24 is disposed in the spool 18 coaxially therewith. At this time, the torsion portion 22 is positioned in a state in which a portion of the outer peripheral surface of the disk 48 which extends substantially from an axial direction center to the pipe-shaped portion 42 side abuts the inner peripheral surface of the spool 18, and the central axis of the spool 18 corresponds to that of the torsion bar 24. Further, a portion of the outer peripheral surface of the disk 48 which extends substantially from the axial direction center to the piece 50 to be locked is rotatably supported by the supporting plate 16 of the frame 12 via a ring 52. Moreover, a portion of the gear portion 30 of the shaft portion 26 for pretension at which the external tooth gear 36 is formed is rotatably supported by a cover drum 58, which will be described later. In this way, the spool 18 is rotatably supported by the frame 12.

A notched ring 54, which is formed substantially in an annular shape, has a notched portion in the peripheral direction thereof, and has a female screw 72 at the inner side, is screwed to the male screw 46 of the pipe-shaped portion 42. In a state in which the torsion portion 22 is provided at the inner side of the spool 18, a peripheral direction end surface 54A of the notched ring 54 abuts a rail-like projection 56 (see FIGS. 2A through 4) which is provided on the inner periphery of the spool 18 in the axial direction thereof. In a normal state, the notched ring 54 is disposed at the one end of the male screw 46 (the shaft portion 26 for pretension side, and the position shown in FIG. 2A). When the spool 18 relatively rotates around the locking shaft portion 40, the notched ring 54 also rotates together with the spool 18 and moves to the other end (the disk 48 side, and the position shown in FIG. 3). This movement is stopped when an opposing surface 54B of the notched ring 54 which opposes the disk 48 abuts the disk 48, and the rotation of the spool 18 around the locking shaft portion 40 is also stopped.

A substantially semicircular engaging projection 74A is formed on the opposing surface 54B of the notched ring 54 in the peripheral direction thereof. In contrast, an engaging concave portion 78A is formed at the disk 48 so as to correspond to this engaging projection 74. In a state in which the opposing surface 54B abuts the disk 48, the engaging projection 74A enters and engages the engaging concave portion 78A without clearance therebetween. In this way, outward movement in the radial direction of the notched ring 54 is prevented. Accordingly, in a state in which the notched ring 54 abuts the disk 48, when a large rotating force is further applied to the spool 18 in the withdrawing direction of the webbing and the notched ring 54 moves toward the disk 48, the pressure-receiving side flank of the female screw 72 receives outward force in the radial direction of the shaft portion 40 for locking along the pressure-receiving side flank of the male screw 46. However, even in this case, the notched ring 54 is not moved outwardly in the radial direction and the female screw 72 is not removed from the male screw 46.

Figure 2B:
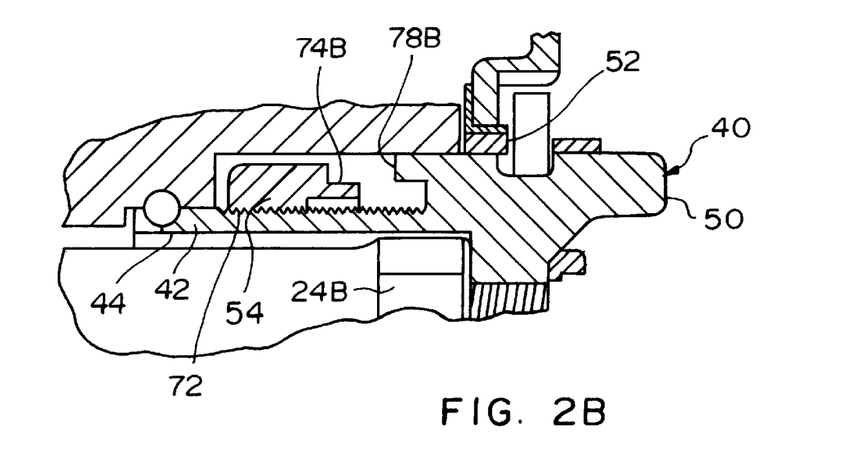
FIG. 2B is a partial cross-sectional view taken along line II—II in FIG. 1 relating to a second embodiment of the present invention.

In the embodiment of the invention illustrated in FIG. 2B, a substantially semicircular engaging recess 74B is formed on the opposing surface 54B of the notched ring 54, while an engaging convex portion 78B is formed at the disk 48 so as to correspond thereto. This embodiment operates in the same manner as the one described with respect to FIG. 2A when the notched ring 54 abuts the disk 48 to prevent the ring from moving radially outward.

An inertial lock mechanism (unillustrated) is provided at the outer side of the supporting plate 16 (the opposite side of the side at which the spool 18 is provided, and the right-hand side in FIGS. 2 and 3). In this inertial lock mechanism, when deceleration of a predetermined value or more is applied to a vehicle at which the webbing retractor 10 is attached, or when the webbing 20 is withdrawn rapidly, the piece 50 to be locked is locked so as to prevent the rotation of the torsion portion 22 in the withdrawing direction of the webbing 20 and is not locked in the taking-up direction thereof.

On the other hand, the cover drum 58 having accommodating portions 60 and 62 is fixed to the outer side of the supporting plate 14 (the left-hand side in FIGS. 2 and 3). The diameters of the accommodating portions 60 and 62 are increased in steps outwardly in the radial direction from the rotational axis of the torsion bar 24. The drum 64, around which a wire 94, which will be described later, is wound, is disposed coaxially with the torsion bar 24 at the accommodating portion 60 having a smaller diameter (the portion which is closer to the supporting plate 14).

The drum 64 is formed of a metal (e.g., aluminum or the like) which is softer than the locking shaft portion 40 or the shaft portion 26 for pretension. Further, the drum 64 is disposed so that the substantially semicircular nipping portions 66 and 68 are opposed and form a substantially cylindrical shape. In this state, corresponding peripheral direction ends of the nipping portions 66 and 68 are connected by a substantially S-shaped compression portion 70 which is formed integrally with the nipping portions 66 and 68. Normally, in a state in which the drum 64 is disposed in the accommodating portion 60 (see FIGS. 2 and 3), there are predetermined small clearances between the inner surfaces of the nipping portions 66 and 68 and the distal ends of the projections 32 of the portion 28 to be nipped, and the drum 64 is separated from the shaft portion 26 for pretension in the accommodating portion 60. However, when force in the direction in which the nipping portions 66 and 68 approach each other is applied to the nipping portions 66 and 68, the compression portion 70 is deformed by compression and the nipping portions 66 and 68 approach each other, such that the nipping portions 66 and 68 nip the portion 28 to be nipped. Because the drum 64 is formed of a metal which is softer than the shaft portion 26 for pretension, the projections 32 bite into the inner surfaces of the nipping portions 66 and 68. As a result, the drum 64 and the shaft portion 26 for pretension rotate integrally.

At one end in the axial direction of each of the nipping portions 66 and 68, an engaging piece 76 is provided projecting outwardly in the radial direction. The engaging piece 76 is formed by a narrow break-away portion 76A provided at each of the nipping portions 66 and 68 side and a wide engaging portion 76B formed at the distal end of the break-away portion 76A. The engaging portion 76B is reinforced and formed thicker than the break-away portion 76A toward the one end in the axial direction of the drum 64. When a force having a predetermined value or more is applied to the engaging portion 76B in the peripheral direction of the drum 64, the break-away portion 76A is broken away and the engaging portion 76B is separated from the drum 64.

A substantially disk-shaped drive plate 80 is disposed at the outer side of the cover drum 58 (the opposite side of the supporting plate 14, and the left-hand side in FIGS. 2A and 3). The drive plate 80 is surrounded by ribs 59, which stand upright from the cover drum 58, at three positions around the outer periphery of the drive plate 80. The drive plate 80 is rotatable and coaxial with the torsion bar 24. A substantially circular insertion hole 82, into which the nipping portions 66 and 68 of the drum 64 are inserted, is formed at the center of the drive plate 80.

An increased-diameter portion 82A, into which the engaging piece 76 is inserted, is formed at the insertion hole 82. The drive plate 80 and the drum 64 are rotated integrally by the engaging piece 76 which has been inserted into this increased-diameter portion 82A.

A securing portion 84, into which a pipe-shaped body attached to one end of the wire 94 is fitted and secured, is formed at the drive plate 80. The wire 94 one end of which is secured to the securing portion 84 is wound around the periphery of the drum 64 a number of turns (about two turns in the present embodiment). The other end of the wire 94 is wound around a piston (unillustrated) inside a cylinder 86 provided at the frame 12 and is secured to an outer portion of the cylinder 86. When a sensor (unillustrated) detects that deceleration of a predetermined value or more has been applied to the vehicle at which the webbing retractor 10 is attached, a gas generator (unillustrated) within a base cartridge 90 provided at the frame 12 is operated such that the piston is moved rapidly toward the innermost side of the cylinder 86. The wire 94 is rapidly withdrawn due to this movement of the piston, and rotating force is applied to the drive plate 80.

As shown in FIG. 1, a shear pin 92 protrudes from the frame 12 through the cover drum 58. Because this shear pin 92 engages with a concave portion 101 formed at the drive plate 80, the drive plate 80 does not usually rotate in the taking-up direction of the webbing 20 (in the direction of arrow A in FIG. 1). However, when the wire 94 is rapidly withdrawn into the cylinder 86 and rotating force of a predetermined value or more is applied to the drive plate 80, the shear pin 92 is pressed by the concave portion 101 and is broken away, and the drive plate 80 thereby rotates.

A substantially annular-shaped stopper plate 96 is disposed at the outer side of the drive plate 80. The stopper plate 96 is supported by an unillustrated positioning member so as to be coaxial with the torsion bar 24 and rotatable around a central axis J (see FIG. 1) of the torsion bar 24. (In FIGS. 2A and 3, this stopper plate 96 and a cover plate 102, which will be described later, are omitted for convenience of illustration.)

A moving projection 98, which extends outwardly from the stopper plate 96 in the radial direction thereof and whose distal end portion is bent substantially at a right angle toward the drive plate 80, is formed at the stopper plate 96. The distal end of the moving projection 98 is placed within a long groove 100 which is cut substantially in the shape of an arc along the circumferential direction of the drive plate 80. The moving projection 98 moves inside the long groove 100 due to relative rotation of the stopper plate 96 and the drive plate 80. The central angle of the long groove 100 is about 90°, and the stopper plate 96 and the drive plate 80 relatively rotate about 9020 .

A cover plate 102 is further disposed at the outer side of the stopper plate 96 and is fixed to the cover drum 58. A state in which the drum 64, the drive plate 80, and the stopper plate 96 are accommodated within the accommodating portions 60 and 62 of the cover drum 58 is maintained by this cover plate 102.

A stopper projection 104 protrudes from the cover plate 102 toward the stopper plate 96. The length of this stopper projection 104 is determined so that the stopper projection 104 abuts the moving projection 98 and does not enter the long groove 100. When the wire 94 is withdrawn into the cylinder 86 and the drive plate 80 rotates in the taking-up direction of the webbing (in the direction of arrow A), the drive plate 80 rotates about 90° at the initial stage of rotation while the stopper plate 96 is stopped, and then the drive plate 80 rotates about 360° together with the stopper plate 96. As a result, the drive plate 80 rotates about 450° from the start to the end of the rotation.

The amount of rotation of the relative rotation of the drive plate 80 and the stopper plate 96 can be changed by changing the length of the long groove 100. The amount of rotation of the drive plate 80 can be thereby changed. Moreover, the moving projection 98 may be disposed at any position within the long groove 100 during the rotation of the drive plate 80 provided that the drive plate 80 rotate about 450° from the start to the end of the rotation.

Next, the operation and effect of the webbing retractor 10 relating to the present embodiment will be explained.

In a normal state, i.e., when deceleration of the vehicle to which the webbing retractor 10 is attached is less than a predetermined value, the unillustrated inertial lock mechanism does not lock the piece 50 to be locked. Since the gas generator within the base cartridge 90 is not operated as well, the wire 94 is not withdrawn into the cylinder 86. As a result, the spool 18 (see FIGS. 1 through 3) rotates freely and the webbing 20 can be withdrawn and taken up.

When deceleration of a predetermined value or more is applied to the vehicle, the inertial lock mechanism locks the rotation of the piece 50 to be locked in the withdrawing direction of the webbing 20 (in the direction of arrow B in FIG. 1). Accordingly, rotation of the spool 18, which rotates together with the torsion portion 22, is also locked in the withdrawing direction of the webbing 20 and the webbing 20 cannot be withdrawn any further.

Moreover, because the gas generator is operated and the unillustrated piston is moved to the innermost side of the cylinder 86, the wire 94 is rapidly withdrawn into the cylinder 86. Since rotation of the drive plate 80 is stopped by the shear pin 92, the drum 64 does not rotate as well. As a result, the drum 64, around which the wire 94 is wound, is suddenly wound tightly by this wire 94 and the compression portion 70 (see FIG. 1) is deformed by compression. The nipping portions 66 and 68 approach each other and nip the portion 28 to be nipped of the shaft portion 26 for pretension. Since the drum 64 is formed of a metal which is softer than the portion 28 to be nipped, the projections 32 of the portion 28 to be nipped bite into the inner surfaces of the nipping portions 66 and 68, and the drum 64 and the shaft portion 26 for pretension are formed integrally.

When the wire 94 is further withdrawn into the cylinder 86, rotating force is applied to the drive plate 80, and the concave portion 101 presses the shear pin 92 so that the shear pin 92 is broken away. In this way, the drive plate 80 rotates in the taking-up direction of the webbing 20 (in the direction of arrow A) of the webbing 20. Because the engaging pieces 76 of the drum 64 are inserted into the increased-diameter portions 82A of the insertion hole 82 of the drive plate 80, the drum 64 rotates together with the drive plate 80. The external tooth gear 36 which is formed at the gear portion 30 of the shaft portion 26 for pretension engages with the internal tooth gear 38 at the inner periphery of the spool 18, and the unillustrated inertial lock mechanism does not lock the rotation of the locking shaft portion 40 in the taking-up direction of the webbing 20. Consequently, the spool 18 rotates in the taking-up direction of the webbing 20 (in the direction of arrow A) via the shaft portion 26 for pretension due to the rotation of the drum 64.

When the unillustrated piston moves to the innermost side of the cylinder 86 and the wire 94 is withdrawn most into the cylinder 86, the drive plate 80 is rotated about 450° from the initial stage and the webbing 20 is tightened to the maximum. In this way, the webbing 20 fits against a wearer of the webbing 20 without slack.

Next, when a withdrawing force of a predetermined value or more is applied to the webbing 20 by the inertial force of the wearer of the webbing 20, the force is applied to the spool 18 as a rotating force in the withdrawing direction of the webbing 20 (in the direction of arrow B in FIG. 1). Since the unillustrated inertial lock mechanism locks the rotation of the locking shaft portion 40 in the withdrawing direction of the webbing 20, the rotation of the torsion bar 24, in which the inserting portion 24B at the other end is inserted through the insertion hole 44 of the locking shaft portion 40, is also locked at the other end. On the other hand, the inserting portion 24A at the one end of the torsion bar 24 is inserted into the shaft portion 26 for pretension, such that the shaft portion 26 for pretension rotates integrally with the spool 18 due to the engagement between the external tooth gear 36 and the internal tooth gear 38. As a result, the rotating force of the spool 18 is transmitted to the torsion bar 24 via the shaft portion 26 for pretension, the torsion bar is plastically deformed and starts to be twisted, and thereby starting the action of force limiter which prevents tensile force of a predetermined value or more being applied to the webbing 20. At this time, when the spool 18 rotates around the locking shaft portion 40, the end surface 54A of the notched ring 54 is pressed by the rail-like projection 56, and the notched ring 54 is rotated and starts to move toward the disk 48.

Further, because the drum 64 which bites into the nipped portion 28 of the shaft portion 26 for pretension also rotates in the withdrawing direction of the webbing 20 (in the direction of arrow B), the drive plate 80 also rotates in the withdrawing direction of the webbing 20 and the wire 94 is stretched within the cylinder 86.

When the drive plate 80 rotates substantially to its initial position, the moving projection 98 abuts the stopper projection 104. Accordingly, the rotation of the drive plate 80 is stopped. In this state, when rotating force is further applied to the spool 18 in the withdrawing direction of the webbing 20 (in the direction of arrow B), the drum 64 rotates in the withdrawing direction of the webbing 20. Thus, rotating force is applied to the engaging pieces 76 which are accommodated within the increased-diameter portions 82A of the drive plate 80 whose rotation is stopped, and the break-away portions 76A are broken away. In this way, the shaft portion 26 for pretension is separated from the drive plate 80 and is relatively rotatable around the drive plate 80. Thus, the torsion bar 24 is further twisted and continues the action of force limiter, and the spool 18 is rotated in the withdrawing direction of the webbing 20. Then, the torsion bar 24 is deformed by torsion until the rotating force applied to the shaft portion 26 for pretension via the spool 18 due to the withdrawing of the webbing 20 is balanced with the torsional reaction force of the torsion bar 24.

The nipping portions 66, the shaft portion 26 for pretension, and the spool 18 (see FIGS. 1 through 3) also rotate in correspondence with the angle of rotation due to the deformation by torsion of the torsion bar 24, and the webbing 20 is withdrawn. The action of force limiter which prevents tensile load applied to the webbing 20 from being a predetermined value or more takes place.

When the rotating force applied to the spool 18 is large, the notched ring 54, which has moved toward the disk 48, abuts the disk 48 (see FIG. 3) such that the notched ring 54 does not move any further. At this time, the engaging projection 74A formed at the notched ring 54 is accommodated within and engaged with the engaging concave portion 78A formed at the disk 48 without clearance therebetween.

When the rotating force is further applied to the spool 18 in the withdrawing direction of the webbing 20 (in the direction of arrow B) and the notched ring 54 is strongly pressed toward the disk 48 in a state in which the notched ring 54 abuts the disk 48, the pressure-receiving side flank of the female screw 72 receives outward force in the radial direction of the locking shaft portion 40 along the pressure-receiving side flank of the male screw 48. However, in this case as well, because the engaging projection 74 engages the engaging concave portion 78A, outward movement in the radial direction of the notched ring 54 is prevented. As a result, the notched ring 54 is not extended outwardly in the radial direction, the female screw 72 is not removed from the male screw 48, and a state in which the rotation of the spool 18 is restricted is maintained.

In this way, in the webbing retractor 10 relating to the present embodiment, the engaging projection 74A engages the engaging concave portion 78A in a state in which the notched ring 54 abuts the disk 48, and the outward movement in the radial direction of the notched ring 54 is prevented. As a result, the amount of rotation of the spool 18 is restricted without increasing the weight or without requiring much time and labor for the manufacturing thereof, and the amount of withdrawal of the webbing 20 can be made constant.

Figure 4:
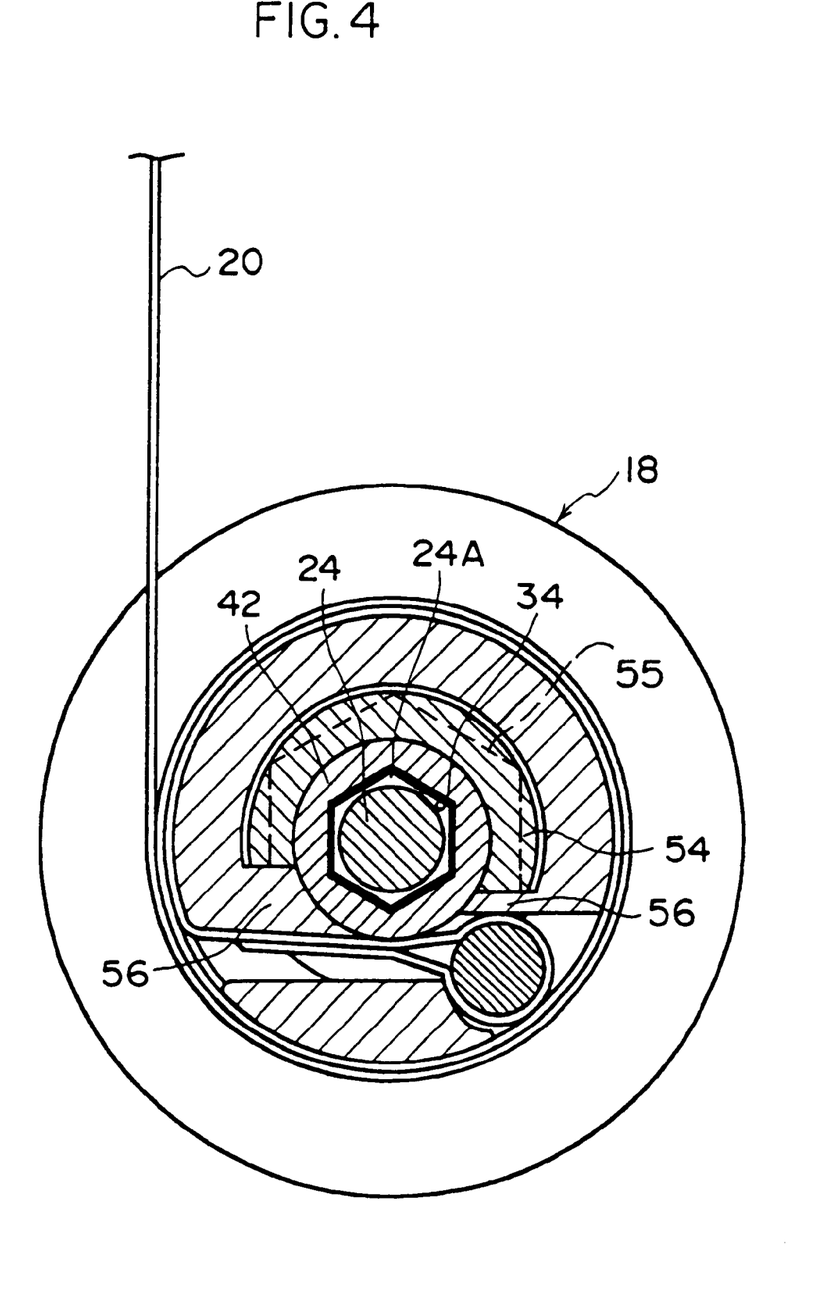
FIG. 4 is a cross-sectional view taken along line IV—IV in FIG. 3.

FIG. 4 indicates that the outer periphery 55 of the notched ring 54 may be either annular or block-shaped (as shown in phantom).

Figure 5:
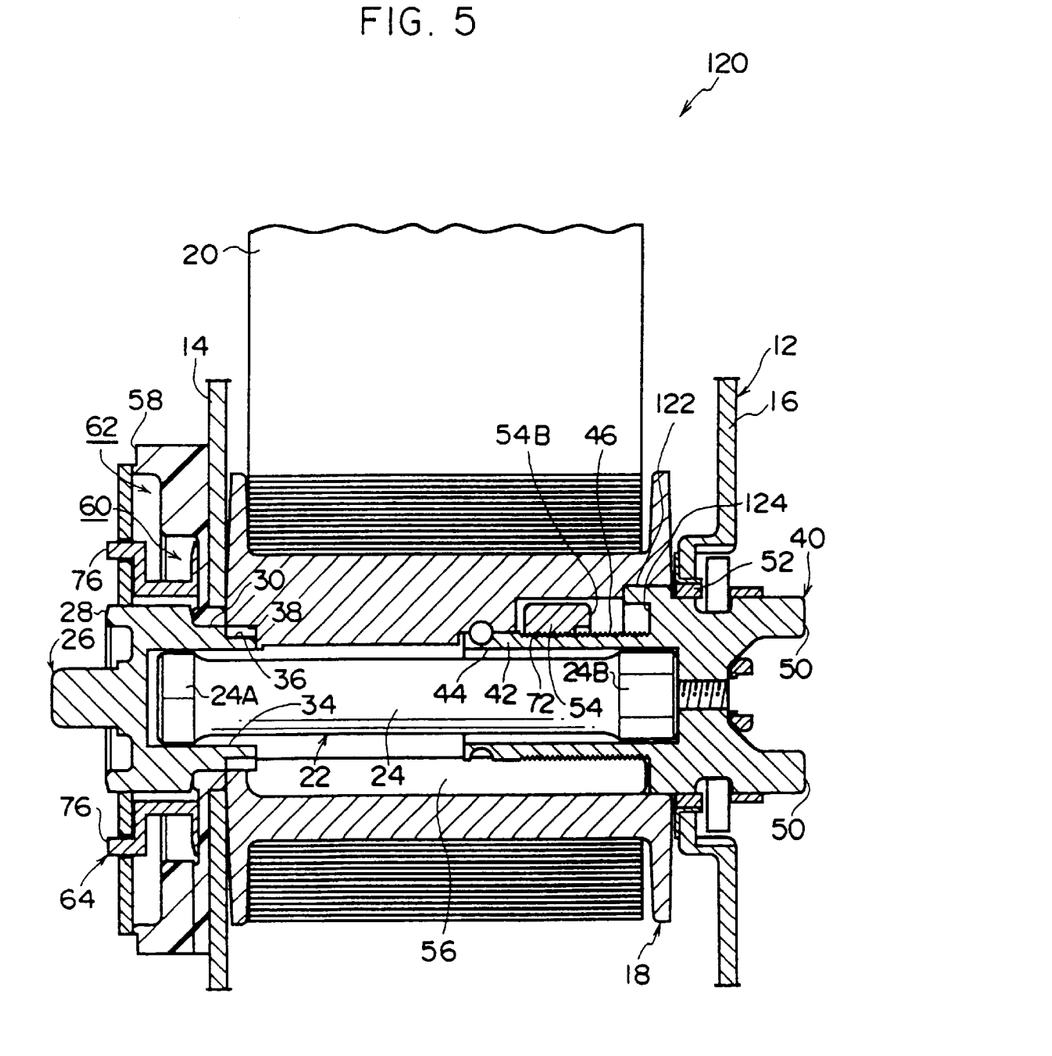
FIG. 5 is a cross-sectional view which shows a webbing retractor relating to a second embodiment of the present invention.
Figure 6:
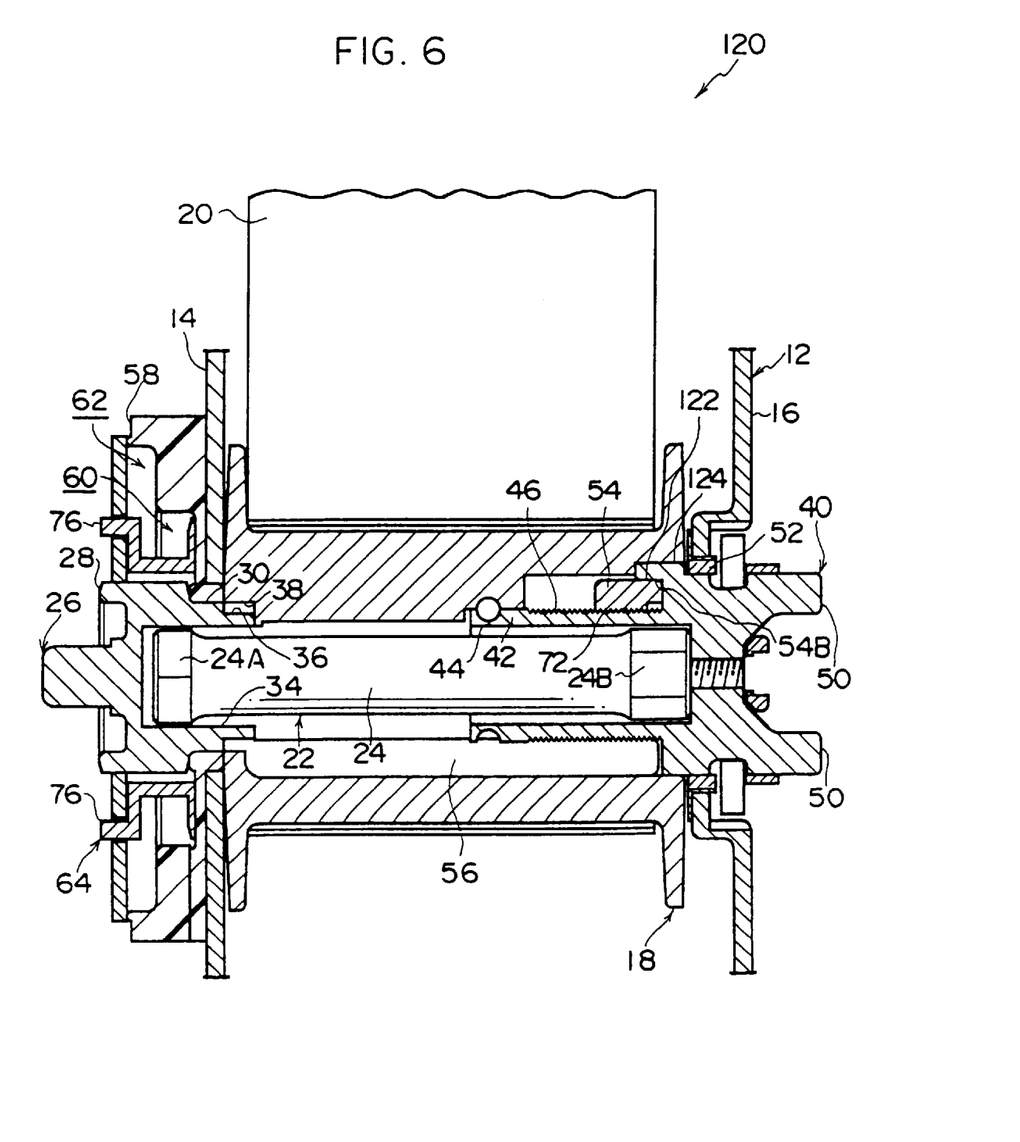
FIG. 6 is a cross-sectional view, which shows a state in which a webbing is withdrawn from the state shown in FIG. 5, of the webbing retractor relating to the second embodiment of the present invention.

FIGS. 5 and 6 show a webbing retractor 120 relating to a second embodiment of the present invention in which a device for restricting an amount of rotation is used. Members and portions which are the same as those in the webbing retractor 10 relating to the first embodiment are denoted by the same reference numerals, and descriptions thereof are omitted.

In this webbing retractor 120, a portion which corresponds to the engaging projection 74 shown in the first embodiment is not formed at a notched ring 54.

Further, the diameter of a disk 122 of a locking shaft portion 40 is larger than that of the disk 48 relating to the first embodiment. An engaging concave portion 124 is formed at the disk 122 so as to correspond to an opposing surface 54B of the notched ring 54.

Then, as shown in FIG. 6, a portion of the notched ring 54 at the disk 122 side which has moved toward the disk 122 is accommodated within and engaged with the engaging concave portion 124. (Therefore, in this webbing retractor 120, the portion of the notched ring 54 at the disk 122 side effects the same action as that of the engaging projection 74 relating to the first embodiment.) In this way, outward movement in the radial direction of the notched ring 54 is prevented. As a result, in the webbing retractor 120 relating to the second embodiment in the same way as in the webbing retractor 10 relating to the first embodiment, the amount of rotation of the spool 18 is restricted without increasing the weight or without requiring much time and labor for the manufacturing thereof and the amount of withdrawal of the webbing 20 can be made constant.

The preventing means for preventing outward movement in the radial direction of this notched ring 54 in a state in which the notched ring 54 abuts the disk 48 (or 122) is not limited to the engaging projection 74 or the portion of the notched ring 54 at the disk 122 side. For example, it is possible that an engaging concave portion is formed on the opposing surface 54B of the notched ring 54 and that a projection, which engages this engaging concave portion in a state in which the notched ring 54 abuts the disk 48 (or 122), is formed at the disk 48 (or 122).

Moreover, the moving body is not limited to the above-described notched ring 54. Any moving body may be used provided that the moving body rotates together with the spool 18 and moves in the axial direction of the locking shaft portion 40 by being screwed to the male screw 46 of the locking shaft portion 40. Accordingly, for example, the moving body may be formed in an annular shape or a block shape as indicated in FIG. 4.

The invention described in claim 1, comprising: a shaft body which has a male screw on the outer periphery; a moving body which is screwed to the male screw and which moves in the axial direction of the shaft body due to rotation around the shaft body; restricting means which restricts the amount of movement of the moving body to a predetermined range; and preventing means which prevents outward movement in the radial direction of the moving body in a state in which the movement of the moving body is restricted by the restricting means. Accordingly, the device for restricting an amount of rotation is formed and the amount of rotation can be restricted without increasing the weight or without requiring much time and labor for the manufacturing thereof.

The invention described in claim 2 according to the invention described in claim 1, wherein the restricting means is a wall body which is formed at the shaft body and which, by abutting the moving body which has moved in the axial direction of the shaft body due to the rotation, restricts the movement thereof, and the preventing means is an engaging portion which is formed at the moving body and which engages with a portion to be engaged formed on the wall body in a state in which the moving body abuts the wall body. Consequently, the structure is simple and the outward movement in the radial direction of the moving body can be prevented.

The invention described in claim 3, comprising: a shaft which has a male screw on the outer periphery; a spool which is coaxially rotatable with the shaft and which effects one of taking-up and withdrawing of a webbing due to the rotation; a ring which is screwed to the male screw and which integrally rotates with the spool, the ring moving in the axial direction of the shaft due to the rotation; a restricting wall which is formed at the shaft and which, by abutting the ring which has moved in the axial direction of the shaft, restricts the movement thereof; and an engaging portion which is formed at the ring and, in a state in which the ring abuts the restricting wall, engages with a portion to be engaged formed on the restricting wall and prevents outward movement of the ring in the radial direction. Therefore, the amount of rotation of the spool can be restricted without increasing the weight and without requiring much time and labor for the manufacturing thereof.

What is claimed is:

1. A device for restricting an amount of rotation, comprising:

a shaft body which has a male screw on the outer periphery;

a moving body which is screwed to the male screw and which moves in the axial direction of said shaft body due to rotation around said shaft body, said moving body having an engaging face;

restricting wall body which restricts the amount of movement of said moving body to a predetermined range by engaging said face of said moving body; and preventing means for preventing a radial deformation of said moving body when the movement of said moving body is restricted by said restricting wall body, including an engaging portion which is coextensive with the engaging face of said moving body and which engages with a substantially complementary shaped engaging portion formed on said wall body when said moving body abuts said wall body.

2. A device for restricting an amount of rotation according to claim 1, wherein said portion to be engaged formed on said wall body is an engaging concave portion which is formed in a shape corresponding to the shape of an engaging projection provided on a surface of said moving body which opposes said wall body.

3. A device for restricting an amount of rotation according to claim 1, wherein said portion to be engaged formed on said wall body is an engaging convex portion which is formed in a shape corresponding to the shape of a surface of said moving body which opposes said wall body.

4. A device for restricting an amount of rotation according to claim 1, wherein said engaging portion provided on the surface of said moving body which opposes said wall body is an engaging concave portion which engages with an engaging projection provided on said wall body.

5. A device for restricting an amount of rotation according to claim 1, wherein said moving body has an outer periphery formed in an annular shape.

6. A device for restricting an amount of rotation according to claim 1, wherein said moving body has an outer periphery formed in a block shape.

7. A webbing retractor, comprising:

a shaft which has a male screw on the outer periphery;

a spool which is coaxially rotatable with said shaft and which effects one of taking-up and withdrawing of a webbing;

a ring which is screwed to the male screw and which integrally rotates with said spool, said ring moving in the axial direction of said shaft due to the rotation;

a restricting wall which is formed at said shaft and having one of a concave and convex portion for engaging said ring which has moved in the axial direction of said shaft to restrict the movement thereof; and an engaging portion which is formed at said ring and which is complementary in shape to said restricting wall portion that engages with said portion on said restricting wall and prevents a radially directed deformation of said ring.

8. A webbing retractor according to claim 7, wherein said portion to be engaged formed on said restricting wall is an engaging concave portion which is formed in a shape corresponding to the shape of an engaging projection provided on a surface of said ring which opposes said restricting wall.

9. A webbing retractor according to claim 7, wherein said portion to be engaged formed on said restricting wall is an engaging convex portion which is formed in a shape corresponding to the shape of a concave surface of said ring which opposes said restricting wall.

10. A webbing retractor according to claim 7, wherein said ring has an outer periphery formed in an annular shape.

11. A webbing retractor according to claim 7, wherein said ring has an outer periphery formed in a block shape.

* * * * *